(12) United States Patent
Takahama et al.

(10) Patent No.: US 7,542,835 B2
(45) Date of Patent: Jun. 2, 2009

(54) VEHICLE IMAGE PROCESSING DEVICE

(75) Inventors: Taku Takahama, Yokosuka (JP);
Takeshi Kimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 575 days.

(21) Appl. No.: 10/981,709

(22) Filed: Nov. 5, 2004

(65) Prior Publication Data
US 2005/0102070 A1  May 12, 2005

(30) Foreign Application Priority Data
Nov. 11, 2003  (JP) .............................. 2003-381181

(51) Int. Cl.
*G06F 17/00* (2006.01)
(52) U.S. Cl. ...................... 701/45; 701/200; 701/201; 701/208; 701/209; 701/301; 701/36; 250/330; 340/435; 340/937
(58) Field of Classification Search ................... 701/45, 701/200–201, 208–209, 301, 36; 180/167, 180/169, 271, 273, 227; 250/330; 340/435, 340/937
See application file for complete search history.

(56) References Cited

U.S. PATENT DOCUMENTS

| | | | | |
|---|---|---|---|---|
| 4,926,346 A | * | 5/1990 | Yokoyama | 701/28 |
| 4,942,533 A | * | 7/1990 | Kakinami et al. | 701/225 |
| 5,386,285 A | * | 1/1995 | Asayama | 356/4.01 |
| 5,410,346 A | * | 4/1995 | Saneyoshi et al. | 348/116 |
| 5,475,494 A | * | 12/1995 | Nishida et al. | 356/4.01 |
| 5,487,116 A | * | 1/1996 | Nakano et al. | 382/104 |
| 5,530,420 A | * | 6/1996 | Tsuchiya et al. | 340/435 |
| 5,554,983 A | * | 9/1996 | Kitamura et al. | 340/937 |
| 5,555,312 A | * | 9/1996 | Shima et al. | 382/104 |
| 5,555,555 A | * | 9/1996 | Sato et al. | 382/104 |
| 5,621,645 A | * | 4/1997 | Brady | 701/117 |
| 5,757,287 A | * | 5/1998 | Kitamura et al. | 340/937 |
| 5,850,254 A | * | 12/1998 | Takano et al. | 348/148 |
| 6,191,704 B1 | * | 2/2001 | Takenaga et al. | 340/903 |
| 6,278,918 B1 | * | 8/2001 | Dickson et al. | 701/23 |
| 6,311,123 B1 | * | 10/2001 | Nakamura et al. | 701/96 |
| 6,327,522 B1 | * | 12/2001 | Kojima et al. | 701/1 |
| 6,339,740 B1 | * | 1/2002 | Seto et al. | 701/96 |
| RE37,610 E | * | 3/2002 | Tsuchiya et al. | 340/435 |

(Continued)

FOREIGN PATENT DOCUMENTS

JP  10-97699  4/1998

*Primary Examiner*—Thomas G Black
*Assistant Examiner*—Wae Louie
(74) *Attorney, Agent, or Firm*—Global IP Counselors, LLP

(57) ABSTRACT

A vehicle image processing device is configured and arranged to capture an image of an area in front of a host vehicle in which the vehicle image processing device is installed and process only a small portion of the captured image to determine if an actual preceding vehicle is present in front of the host vehicle based on behavior information of the host vehicle. Based on the behavior information of the vehicle, the vehicle image processing device estimates a potential preceding vehicle position in front of the host vehicle. Then, based on the predicted potential preceding vehicle position, the vehicle image processing device sets an image processing region of the image captured. The vehicle image processing device then processes the image within only the image processing region top detect if an actual preceding vehicle is present in front of the host vehicle.

24 Claims, 10 Drawing Sheets

U.S. PATENT DOCUMENTS

| | | | |
|---|---|---|---|
| 6,366,691 B1 * | 4/2002 | Sogawa | 382/154 |
| 6,370,261 B1 * | 4/2002 | Hanawa | 382/104 |
| 6,470,271 B2 * | 10/2002 | Matsunaga | 701/301 |
| 6,477,260 B1 * | 11/2002 | Shimomura | 382/106 |
| 6,590,521 B1 * | 7/2003 | Saka et al. | 342/70 |
| 6,600,986 B2 * | 7/2003 | Steinle et al. | 701/70 |
| 6,731,332 B1 * | 5/2004 | Yasui et al. | 348/148 |
| 6,744,380 B2 * | 6/2004 | Imanishi et al. | 340/937 |
| 6,873,912 B2 * | 3/2005 | Shimomura | 701/301 |
| 6,888,953 B2 * | 5/2005 | Hanawa | 382/104 |
| 6,990,216 B2 * | 1/2006 | Yamamura | 382/106 |
| 2002/0134151 A1 * | 9/2002 | Naruoka et al. | 73/291 |
| 2003/0069695 A1 * | 4/2003 | Imanishi et al. | 701/301 |
| 2004/0184638 A1 * | 9/2004 | Nobori et al. | 382/104 |
| 2005/0001715 A1 * | 1/2005 | Itoh et al. | 340/435 |
| 2005/0004761 A1 * | 1/2005 | Takahama et al. | 701/301 |
| 2005/0004762 A1 * | 1/2005 | Takahama et al. | 701/301 |
| 2005/0036660 A1 * | 2/2005 | Otsuka et al. | 382/104 |
| 2005/0102070 A1 * | 5/2005 | Takahama et al. | 701/1 |
| 2006/0164514 A1 * | 7/2006 | Muramatsu et al. | 348/207.99 |
| 2006/0287825 A1 * | 12/2006 | Shimizu et al. | 701/216 |

* cited by examiner

US 7,542,835 B2

VEHICLE IMAGE PROCESSING DEVICE

BACKGROUND OF THE INVENTION

1. Field of the Invention

The present invention relates to an image processing device for a vehicle. More specifically, the present invention relates to an image processing device for a vehicle that is configured and arranged to process an image photographed by a camera to recognize the surrounding circumstances of the vehicle including other vehicles traveling in front of the vehicle.

2. Background Information

Japanese Laid-Open Patent Publication No. 10-097699 discloses an example of a conventional vehicle obstacle detecting device that uses an image captured by a camera to recognize a traveling lane of the vehicle in which the obstacle detecting device is installed. This conventional vehicle obstacle detecting device sets a region of the captured image based on the white lines on the road surfaces and then conducts edge extraction processing only to this region within the traveling lane of the image to detect if an obstacle existing in front of the vehicle.

In view of the above, it will be apparent to those skilled in the art from this disclosure that there exists a need for an improved vehicle image processing device. This invention addresses this need in the art as well as other needs, which will become apparent to those skilled in the art from this disclosure.

SUMMARY OF THE INVENTION

It has been discovered that there are times when white lines on the road surface that define the traveling lane cannot be recognized in the image captured by the camera due to rain, snow, or other conditions. In such case, the conventional vehicle obstacle detecting device disclosed in the above mentioned reference cannot limit the region in the image in which the edge extraction processing is performed. Thus, the image processing efficiency of the conventional vehicle obstacle detecting device declines under the conditions where the white lines on the road cannot be recognized in the image captured by the camera.

Accordingly, one object of the present invention is to provide a vehicle image processing device that does not require recognizing the white lines on the road surface to determine an image processing region, and thus, improves an efficiency of detecting a preceding vehicle regardless of whether the white lines can be recognized or not.

In order to achieve the above mentioned object of the present invention, a vehicle image processing device is provided that comprises an image capturing section, a host vehicle behavior detecting section, a preceding vehicle position predicting section, a processing region setting section and a preceding vehicle detecting section. The image capturing section is configured and arranged to capture an image of an area in front of a host vehicle in which the vehicle image processing device is installed. The host vehicle behavior detecting section is configured to obtain behavior information of the vehicle. The preceding vehicle position predicting section is configured to predict a potential preceding vehicle position based on the behavior information of the host vehicle. The processing region setting section is configured to set an image processing region of the image captured based on the potential preceding vehicle position. The preceding vehicle detecting section is configured to detect if an actual preceding vehicle is present in front of the host vehicle based on processing of the image processing region of the image.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
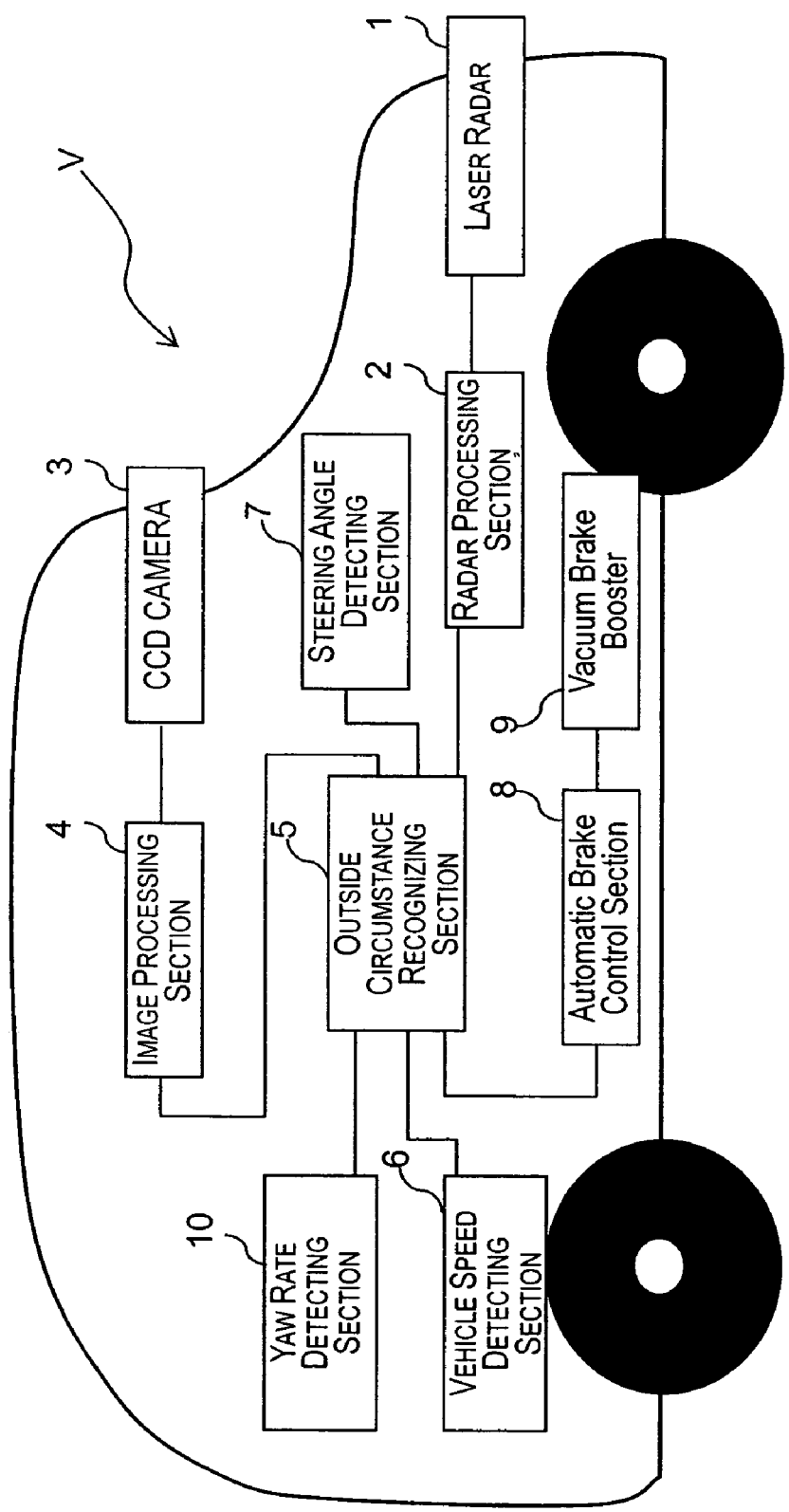
FIG. 1 is a schematic block diagram of a host vehicle with a vehicle image processing device in accordance with a first embodiment of the present invention.

Referring initially to FIGS. 1 to 4, a host vehicle V equipped with a vehicle image processing device is illustrated in accordance with a first embodiment of the present invention. As seen in FIG. 1, the vehicle image processing device of the present invention is preferably installed in the host vehicle V, and configured and arranged to obtain an image of an area in front of the host vehicle V. Then, the vehicle image processing device is configured and arranged to obtain behavior information of the host vehicle V. Based on the behavior information of the host vehicle V, the vehicle image processing device is configured and arranged to predict a potential preceding vehicle position or area of a preceding vehicle that may be traveling generally in front of the host vehicle V. Then, based on this potential preceding vehicle position or area, the vehicle image processing device is configured and arranged to set an image processing region within the image for detecting the preceding vehicle. The potential preceding vehicle position or area shifts or more based on the detected host vehicle behavior. Thus, the image processing region shifts or moves within the captured image depending upon the host vehicle behavior. The vehicle image processing device then is configured and arranged to perform a preceding vehicle detection processing of the image processing region to determine if an actual preceding vehicle exists in the image processing region. This detection process is preferably accomplished by deriving or extracting features or a distinct profile in the image processing region of the image.

Thus, with the vehicle image processing device of the present invention, it is not necessary to detect the white lines of the road where the host vehicle V is traveling in order to conduct the image processing for detecting the preceding vehicle. Therefore, the preceding vehicle detection processing can be conducted efficiently regardless of the conditions under which the white lines can be recognized or not while the host vehicle V is traveling.

FIG. 1 is a block diagram illustrating constituent components of the vehicle image processing device in accordance with the first embodiment of the present invention. As seen in FIG. 1, the vehicle image processing device basically comprises a laser radar 1, a radar processing section 2, a camera or image capturing section 3, an image processing section 4, an outside circumstance recognizing section 5, a vehicle speed detecting section 6, a steering angle detecting section 7, an automatic brake control section 8, a vacuum brake booster 9, and a yaw rate detecting section 10. The laser radar 1 is preferably a scanning type laser radar that is installed on a front portion of the host vehicle V as seen in FIG. 1. The laser radar 1 is preferably configured and arranged to scan laser light over a prescribed scanning region in front of the host vehicle V. The radar processing section 2 is configured and arranged to extract objects within the prescribed scanning region of the laser radar 1, including preceding vehicles that travel generally in front of the host vehicle V, based on the scanning results of the laser radar 1. The radar processing section 2 is preferably configured and arranged to calculate two-dimensional coordinate values (vehicle following distance direction versus vehicle transverse direction) of positions of objects in a coordinate system which has an origin at the host vehicle V and calculate widths (sizes) of the objects.

The camera 3 is preferably a progressive scan CCD camera and installed inside a vehicle cabin at a central, upper portion of a front windshield of the host vehicle V. The camera 3 is preferably configured and arranged to photograph or capture an image of the circumstances in front of the host vehicle V at a high speed. The image processing section 4 is configured and arranged to process the image captured by the camera 3 by setting an observation or image processing region, which is a region to be paid particular attention to, in the vicinity of the coordinates of an object previously captured by the laser radar 1. Thus, an object continues to be detected by using the image captured by the camera 3 even if the laser radar 1 fails to detect the object due to pitching fluctuations or the like of the host vehicle V.

The outside circumstance recognizing section 5 is configured and arranged to recognize the circumstances outside of the host vehicle V. The outside circumstance recognizing section 5 is preferably connected to the radar processing section 2, the image processing section 4, the vehicle speed detecting section 6, the steering angle detecting section 7, and the yaw rate detecting section 10. The vehicle speed detecting section 6 is configured and arranged to detect the vehicle speed preferably based on the rotation of the subordinate drive wheels of the host vehicle V. The steering angle detecting section 7 is configured and arranged to detect the steering angle of the host vehicle V. The yaw rate detecting section 10 is configured and arranged to detect the yaw rate of the host vehicle V.

The outside circumstance recognizing section 5 is configured and arranged to substantially accurately determine whether an obstacle to the host vehicle V (such as a preceding vehicle) exists by using information regarding the positions of the objects detected by the radar processing section 2 and the positions of the objects tracked by the image processing section 4. The outside circumstance recognizing section 5 is then configured and arranged to send the result of the determination to the automatic brake control section 8. The automatic brake control section 8 is configured and arranged to send a drive signal to the vacuum brake booster 9 to generate a braking force against the front and rear wheels of the host vehicle V depending on the determination results of the outside circumstance recognizing section 5.

The radar processing section 2, the image processing section 4, the outside circumstance recognizing section 5, and the automatic brake control section 8 are preferably each equipped with a microcomputer with programs that control various operations for detecting the preceding vehicle as discussed below and drive circuitry for various actuators. Each of the radar processing section 2, the image processing section 4, the outside circumstance recognizing section 5, and the automatic brake control section 8 can also include other conventional components such as an input interface circuit, an output interface circuit, and storage devices such as a ROM (Read Only Memory) device and a RAM (Random Access Memory) device. Moreover, the radar processing section 2, the image processing section 4, the outside circumstance recognizing section 5, and the automatic brake control section 8 are preferably configured and arranged to exchange information with one another through a communication circuit. Of course, it will be apparent to those skilled in the art from this disclosure that the radar processing section 2, the image processing section 4, the outside circumstance recognizing section 5, and the automatic brake control section 8 can also be installed in a single device such that the single device performs the functions of the radar processing section 2, the image processing section 4, the outside circumstance recognizing section 5, and the automatic brake control section 8. Moreover, it will be apparent to those skilled in the art from this disclosure that the precise structure and algorithms for the radar processing section 2, the image processing section 4, the outside circumstance recognizing section 5, and the automatic brake control section 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
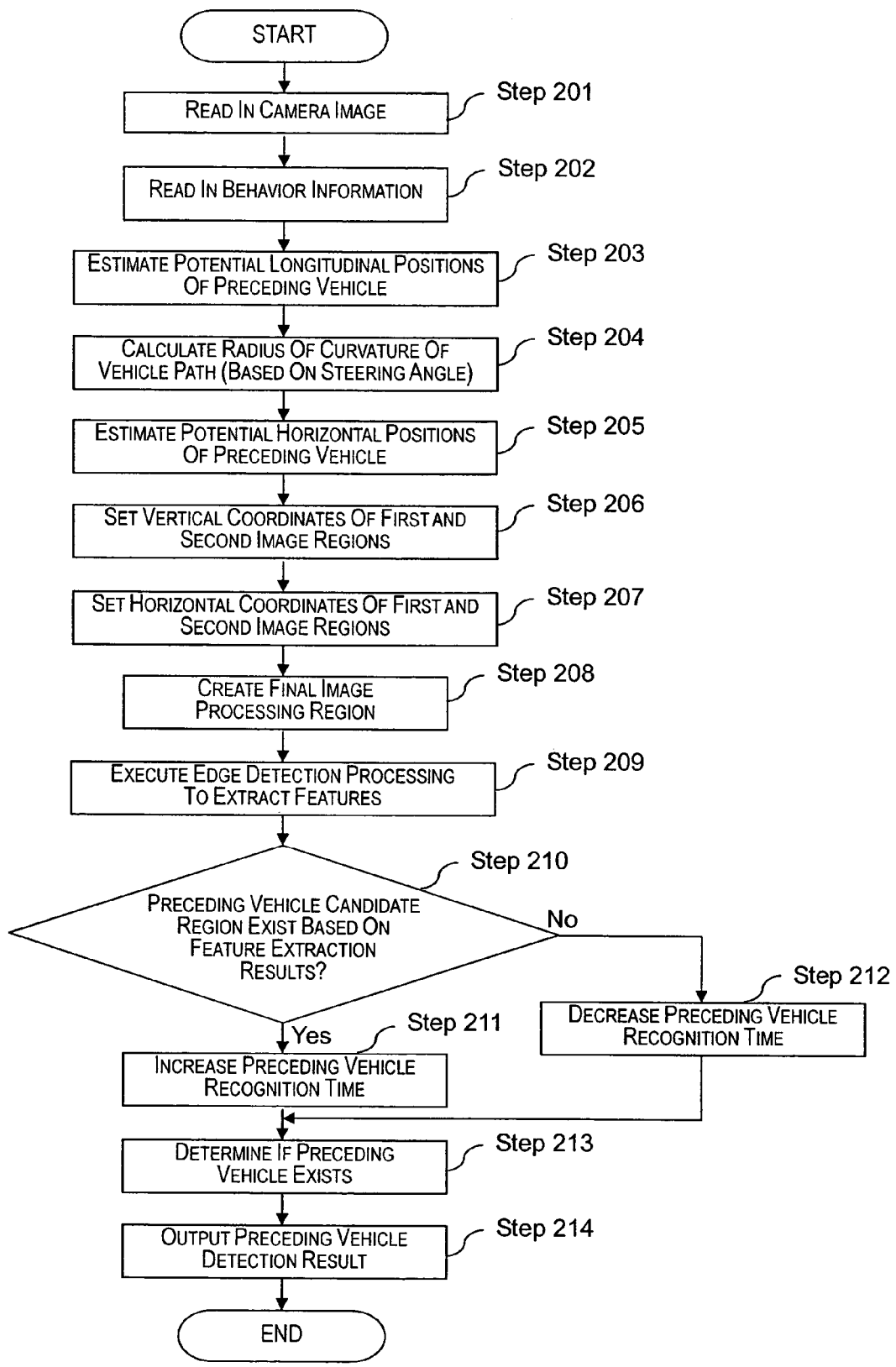
FIG. 2 is a flow chart for explaining a control process for detecting a preceding vehicle using an image processing executed in the vehicle image processing device in accordance with the first embodiment of the present invention.

The operation of the vehicle image processing device of the first embodiment will now be described with reference to FIG. 2. FIG. 2 is a flowchart for explaining a control process of a preceding vehicle detecting program for detecting a preceding vehicle executed by the outside circumstance recognizing section 5. The preceding vehicle detecting program involves processing the image captured by the camera 3. The outside circumstance recognizing section 5 is preferably configured and arranged to execute the preceding vehicle detecting program once per prescribed time period, e.g., once every 50 milliseconds.

In step 201 of FIG. 2, the outside circumstance recognizing section 5 is configured and arranged to read in the image captured by the camera 3 during a current sampling period. Then, in step 202, the outside circumstance recognizing section 5 is configured and arranged to read in behavior information of the host vehicle V including at least one of a vehicle speed Vsp from the vehicle speed detecting section 6, a steering angle Steer from the steering angle detecting section 7, a yaw rate ω from the yaw rate detecting section 10, and other data indicating the behavior of the host vehicle V.

In step 203, the outside circumstance recognizing section 5 is configured and arranged to estimate first and second potential longitudinal positions obj_Y1 and obj_Y2 of a preceding vehicle in the longitudinal direction (following distance direction) of the host vehicle V by using Equations 1-1 and 1-2 below based on first and second prescribed following times Thw1 and Thw2 and the vehicle speed Vsp (in units of m/s) that is read in step 202.

$$obj\_Y1 = Vsp \times Thw1 \qquad \text{(Equation 1-1)}$$

$$obj\_Y2 = Vsp \times Thw2 \qquad \text{(Equation 1-2)}$$

The first and second prescribed following times Thw1 and Thw2 are preferably set such that the first and second prescribed following times Thw1 and Thw2 are both larger than zero, and the second prescribed following time Thw1 is larger than the first prescribed following time Thw2 (0<Thw1<Thw2). The first and second prescribed following times Thw1 and Thw2 are preferably set to represent times that correspond to two different following distances between the preceding vehicle and the host vehicle V that are determined, for example, depending on two different traveling conditions of the host vehicle V. The first and second prescribed following times Thw1 and Thw2 used in step 203 can be set using various methods. For example, the host vehicle V can be equipped with a following distance control system configured and arranged to execute a following distance control so that the host vehicle V travels at or below a preset vehicle speed with a distance between the host vehicle V and a preceding vehicle adjusted to a target following distance when the host vehicle V is following the preceding vehicle in the same lane, and to execute a vehicle speed control such that the host vehicle V travels at a preset vehicle speed when a preceding vehicle does not exist in the same lane. In such a case, the driver can determine a predetermined following time ThwACC having a long, medium, and short settings and the first and second prescribed following times Thw1 and Thw2 used in Equations 1-1 and 1-2 can be set to values ThwACC−TermTmp and ThwACC+TermTmp, respectively, where TermTmp is a prescribed positive number. By adopting such an approach, when rain, snow, or the like causes the laser radar 1 to lose sight of the preceding vehicle while the control for detecting the preceding vehicle is performed, the outside circumstance recognizing section 5 is configured and arranged to continue detecting the preceding vehicle accurately by using the image processing of the image captured by the camera 3 in accordance with the first embodiment.

Alternatively, if the host vehicle V is equipped with a navigation device, the first and second prescribed following times Thw1 and Thw2 can be set in accordance with the type of road on which the host vehicle V is traveling as ascertained by the navigation device. For example, by setting the first prescribed following time Thw1 used when traveling general-purpose roads (e.g., county and city roads) shorter than the second prescribed following time Thw2 used when traveling on highways, it is possible to reduce the frequency of situations in which something in the background scenery is misinterpreted to be a preceding vehicle due to the complexity of the scenery surrounding general-purpose roads.

In step 204, the outside circumstance recognizing section 5 is configured and arranged to estimate a radius of curvature Row (in units of meters) of a future path on which the host vehicle V will travel using the following Equation 2.

$$\text{Row} = (1 + A \times Vsp2 \times LWB)/\text{Steer} \qquad \text{(Equation 2)}$$

In Equation 2, A is a stability factor that is unique to the host vehicle V. The stability factor A is preferably a value assumed to be a substantially constant value that is determined based on a weight, a wheelbase dimension, a position of the center of gravity, and a lateral force of the tires. LWB in Equation 2 is the wheelbase dimension, and Steer is the steering angle (in units of radians where clockwise rotation is indicated as a positive value).

In step 205, the outside circumstance recognizing section 5 is configured and arranged to estimate first and second potential horizontal preceding vehicle positions obj_X1 and obj_X2 (i.e., a position in the transverse direction of the host vehicle V) using the following Equation 3. The first and second potential horizontal positions obj_X1 and obj_X2 are the horizontal positions of the preceding vehicle that correspond to the first and second potential longitudinal positions obj_Y1 and obj_Y2, respectively, determined in step 203.

$$\begin{aligned}
&\text{if}(Row > 0), \text{ then} && \text{(Equation 3)}\\
&\{ \quad obj\_X1 = Row + \sqrt{(Row^2 - obj\_Y1^2)},\\
&\quad\quad obj\_X2 = Row + \sqrt{(Row^2 - obj\_Y2^2)} \quad \},\\
&\text{otherwise}\\
&\{ \quad obj\_X1 = Row + \sqrt{(Row^2 - obj\_Y1^2)},\\
&\quad\quad obj\_X2 = Row + \sqrt{(Row^2 - obj\_Y2^2)} \quad \}
\end{aligned}$$

Equation (3) is a function of the form "if (expression), then {statement 1}, otherwise, {statement 2}" whereby statement 1 is executed if 'expression' is satisfied and statement 2 is executed if 'expression' is not satisfied. In short, statement 1 before 'otherwise' in Equation 3 is executed in the case of a rightward curve (Row>0), and statement 2 after 'otherwise' in Equation 3 is executed in the case of a leftward curve.

In steps 206 and 207, the outside circumstance recognizing section 5 is configured and arranged to set a first and second image regions that are disposed within the image captured by the camera 3 based on the behavior information of the host vehicle V. More specifically, the first and second image regions are preferably set such that the first image region corresponds to the first potential longitudinal position obj_Y1 and the first potential horizontal preceding vehicle position obj_X1, and the second image region corresponds to the second potential longitudinal position obj_Y2 and the second potential horizontal preceding vehicle position obj_X2.

First, in step S206, the outside circumstance recognizing section 5 is configured and arranged to convert the first and second potential longitudinal preceding vehicle positions obj_Y1 and obj_Y2 (potential positions of the preceding vehicle in the following distance direction), which are on a coordinate system set on the road surface, into vertical coordinates on a coordinate system set on the image captured by the camera 3 to establish upper and lower vertical coordinate values disp_obj_YA1 and disp_obj_YB1 of a first image region and upper and lower vertical coordinate values disp_obj_YA2 and disp_obj_YB2 of a second image region by using Equations 4-1 to 4-4.

$$disp\_obj\_YA1 = y0 + (focusV \times CAM\_h2/obj\_Y1) \quad \text{(Equation 4-1)}$$

$$disp\_obj\_YB1 = y0 + (focusV \times CAM\_h/obj\_Y1) \quad \text{(Equation 4-2)}$$

$$disp\_obj\_YA2 = y0 + (focusV \times CAM\_h2/obj\_Y2) \quad \text{(Equation 4-3)}$$

$$disp\_obj\_YB2 = y0 + (focusV \times CAM\_h/obj\_Y2) \quad \text{(Equation 4-4)}$$

More specifically, the upper coordinate value disp_obj_YA1 obtained by Equation 4-1 corresponds to an upper boundary of the first image region, the coordinate value disp_obj_YB1 obtained by Equation 4-2 corresponds to a lower boundary of the first image region. The coordinate value disp_obj_YA2 obtained by Equation 4-3 corresponds to an upper boundary of the second image region, and the coordinate value disp_obj_YB2 obtained by Equation 4-4 corresponds to a lower boundary of the second image region. The value y0 used in Equations 4-1 to 4-4 is a vertical coordinate (in units of pix, i.e., number of pixels) of a vanishing point of the image captured by the camera 3 which is determined based on the mounting position and direction of the camera 3. In Equations 4-1 to 4-4, focusV is a value that corresponds to a vertical focal length (in units of pix) of the camera 3 converted into a number of pixels. Also, CAM_h is a value that corresponds to a mounting height (in units of meters) of the camera 3 and CAM_h2 is a value obtained by subtracting a height (in units of meters) of an object (such as a preceding vehicle) considered to be a potential obstacle (obstacle candidate) from CAM_h.

In step 207, based on the first and second prescribed following times Thw1 and Thw2 (Thw1<Thw2), the outside circumstance recognizing section 5 is configured and arranged to establish left and right horizontal coordinates of the first image region disp_obj_XL1 and disp_obj_XR1 and left and right horizontal coordinates of the second image region disp_obj_XL2 and disp_obj_XR2 on a coordinate system set on the image captured by the camera 3 using Equations 5-1 to 5-4.

$$disp\_obj\_XL1 = x0 + (obj\_X1 \times focusH/obj\_Y1) - (Width \times focusH/obj\_Y1) \quad \text{(Equation 5-1)}$$

$$disp\_obj\_XR1 = x0 + (obj\_X1 \times focusH/obj\_Y1) + (Width \times focusH/obj\_Y1) \quad \text{(Equation 5-2)}$$

$$disp\_obj\_XL2 = x0 + (obj\_X2 \times focusH/obj\_Y2) - (Width \times focusH/obj\_Y2) \quad \text{(Equation 5-3)}$$

$$disp\_obj\_XR2 = x0 + (obj\_X2 \times focusH/obj\_Y2) + (Width \times focusH/obj\_Y2) \quad \text{(Equation 5-4)}$$

The left coordinate value disp_obj_XL1 obtained by Equation 5-1 corresponds to a left boundary of the first image region and the right coordinate value disp_obj_XR1 obtained by Equation 5-2 corresponds to a right boundary of the first image region. The left coordinate value disp_obj_XL2 obtained by Equation 5-3 corresponds to a left boundary of the second image region, and the right coordinate value disp_obj_XR2 obtained by Equation 5-4 corresponds to a right boundary of the second image region. The value x0 used in Equations 5-1 to 5-4 is a horizontal coordinate (in units of pix) of the vanishing point which is determined based on the mounting position and direction of the camera 3. The value focusH is the horizontal focal length (in units of pix) of the camera converted into a number of pixels and is determined based on the angle of view of the camera 3 and the resolution of the light receiving element. If the light receiving surface of the camera 3 has a square grid, then the focusV will be equal to the focusH used in Equations 4-1 to 4-4. The value Width is a parameter that determines the width of an image processing region and preferably has a value of at least one half of the width of the host vehicle V.

Figure 3:
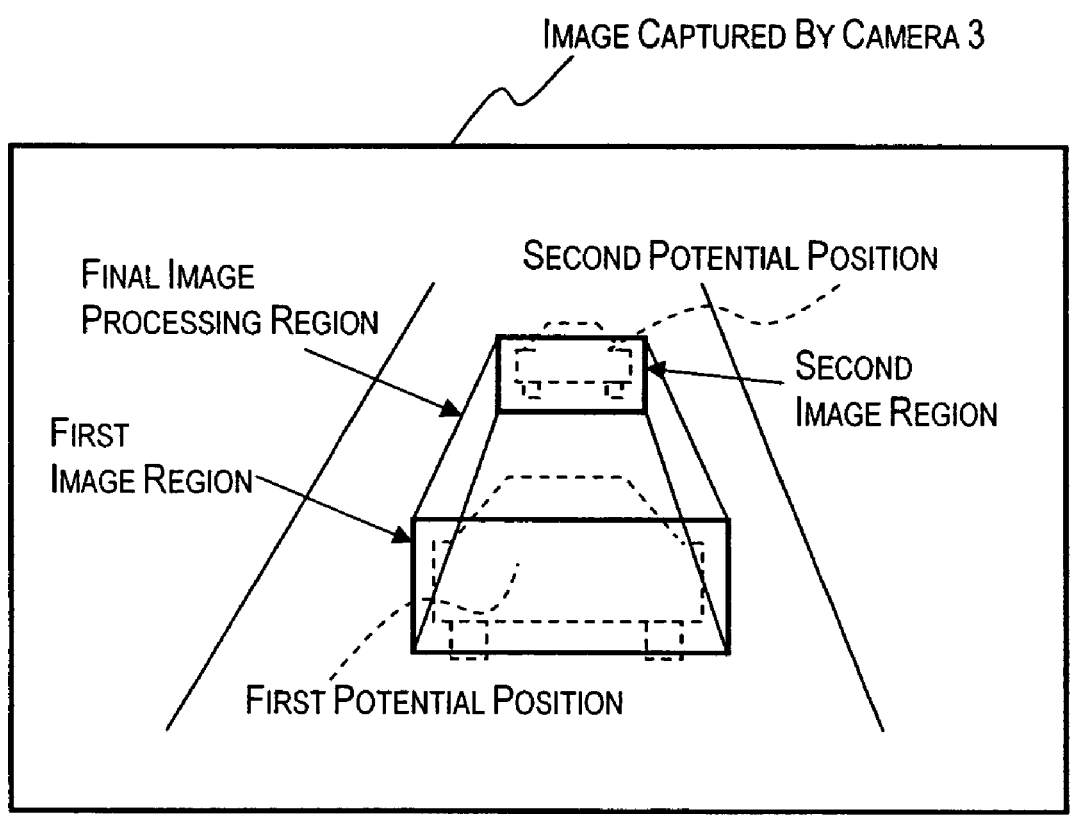
FIG. 3 is a simplified diagrammatic view of an image captured by a camera for illustrating an example of setting first and second image regions in the vehicle image processing device in accordance with the first embodiment of the present invention.

FIG. 3 is a simplified diagrammatic view that illustrates an example of the first and second image regions set on the image captured by the camera 3. The first image region and second image region are image processing regions corresponding to first and second potential preceding vehicle positions represented by coordinates (obj_X1, obj_Y1) and (obj_X2, obj_Y2) estimated based on the first and second prescribed following times Thw1 and Thw2 (0<Thw1<Thw2), respectively. As explained above, the first and second image regions are set based on the first and second prescribed following times Thw1 and Thw2 that are closely adjacent to each other (e.g., Thw1=1 sec. and Thw2=3 sec.). Since the first image region corresponds to the first prescribed following time Thw1, which is shorter, the first potential preceding vehicle position determined based on the Thw1 is closer to the host vehicle V. On the other hand, the second image region corresponds to the longer prescribed following time Thw2, the second potential preceding vehicle position determined based on the Thw2 is farther from the host vehicle V. As seen in FIG. 3, a surface area of the second image processing region, which corresponds to the second potential preceding vehicle position that is farther from the host vehicle V, is smaller than a surface area of the first image region, which corresponds to the first potential preceding vehicle position that is closer to the vehicle. In short, the first and second image regions are preferably set on the image captured by the camera 3 based on the first and second prescribed following times Thw1 and Thw2 (0<Thw1<Thw2) that are closely adjacent to each other in terms of time such that the second image region has a smaller surface area than the first image region. In other words, the region enclosed in the second image region represents a position that is more advanced (i.e., further away from the host vehicle V) than a position represented by the first image region in terms of time.

As is clear from the processing of steps 203 and 206, the centers of the first and second image regions move closer to the top (vicinity of vanishing point y0) of the image captured by the camera 3 in accordance with the products of the vehicle speed Vsp and the respective prescribed following times Thw1 and Thw2 (0<Thw1<Thw2). Furthermore, the surface areas of the first and second image regions decrease in accordance with the products of the vehicle speed Vsp and the respective prescribed following times Thw1 and Thw2 (0<Thw1<Thw2).

In step 208, the first and second image regions set in steps 206 and 207 are connected together into a single region in the order described below to create a final image processing region. First, a first trapezoid region is set which encloses Coordinates 6-1 to 6-4 below.

Upper left coordinate (disp_obj_XL2, disp_obj_YA2) (Coordinate 6-1)
Upper right coordinate (disp_obj_XR2, disp_obj_YA2) (Coordinate 6-2)
Lower left coordinate (disp_obj_XL1, disp_obj_YA1) (Coordinate 6-3)
Lower right coordinate (disp_obj_XR1, disp_obj_YA1) (Coordinate 6-4)

In other words, the first trapezoid region has a generally trapezoid shape with the upper boundary of the second image region as a top edge of the trapezoid and the upper boundary of the first image region as a base of the trapezoid.

Then, a second trapezoid region is set which encloses Coordinates 7-1 to 7-4 below.
Upper left coordinate (disp_obj_XL2, disp_obj_YB2) (Coordinate 7-1)
Upper right coordinate (disp_obj_XR2, disp_obj_YB2) (Coordinate 7-2)
Lower left coordinate (disp_obj_XL1, disp_obj_YB1) (Coordinate 7-3)
Lower right coordinate (disp_obj_XR1, disp_obj_YB1) (Coordinate 7-4)

In other words, the second trapezoid region has a generally trapezoid shape with the lower boundary of the second image region as a top edge of the trapezoid and the lower boundary of the first image region as a base of the trapezoid.

The first and second image regions and the first and second trapezoid regions are then combined or united together to form a single region that includes all of the first and second image regions and the first and second trapezoid regions individual regions. This single region is treated as the final image processing region.

To facilitate ease of understanding, the coordinate values of the first image region are indicated with Coordinates 8-1 to 8-4 below and the coordinate values of the second image region are indicated with Coordinates 9-1 to 9-4 below and shown on a simplified diagrammatic view of the image captured by the camera 3 in FIG. 4.

First Image Region:
Upper left coordinate (disp_obj_XL1, disp_obj_YA1) (Coordinate 8-1)
Upper right coordinate (disp_obj_XR1, disp_obj_YA1) (Coordinate 8-2)
Lower left coordinate (disp_obj_XL1, disp_obj_YB1) (Coordinate 8-3)
Lower right coordinate (disp_obj_XR1, disp_obj_YB1) (Coordinate 8-4)

Second Image Processing Region
Upper left coordinate (disp_obj_XL2, disp_obj_YA2) (Coordinate 9-1)
Upper right coordinate (disp_obj_XR2, disp_obj_YA2) (Coordinate 9-2)
Lower left coordinate (disp_obj_XL2, disp_obj_YB2) (Coordinate 9-3)
Lower right coordinate (disp_obj_XR2, disp_obj_YB2) (Coordinate 9-4)

Figure 4:
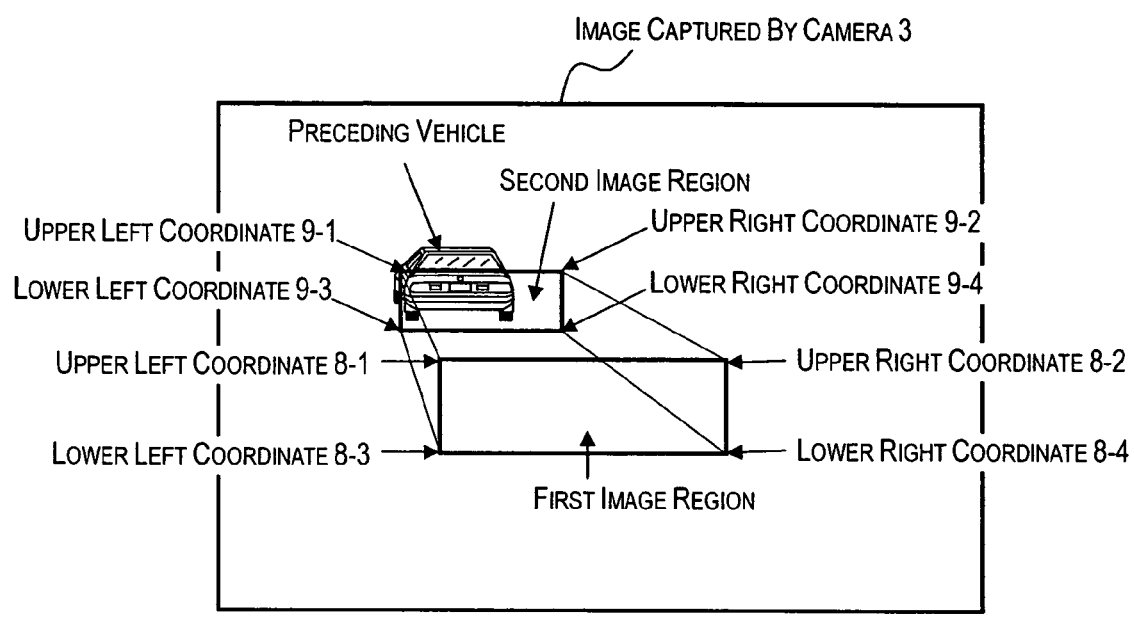
FIG. 4 is a simplified diagrammatic view of an image captured by the camera for illustrating an example of setting an image processing region in the vehicle image processing device in accordance with the first embodiment of the present invention.

Thus, in the image shown in FIG. 4, the final image processing region is a hexagonal region enclosed by Coordinates 9-1, 9-2, 8-2, 8-4, 8-3, and 9-3. FIG. 4 illustrates an example of the image captured by the camera 3 when the host vehicle V is traveling on a road that curves generally in a leftward direction.

Figure 5:
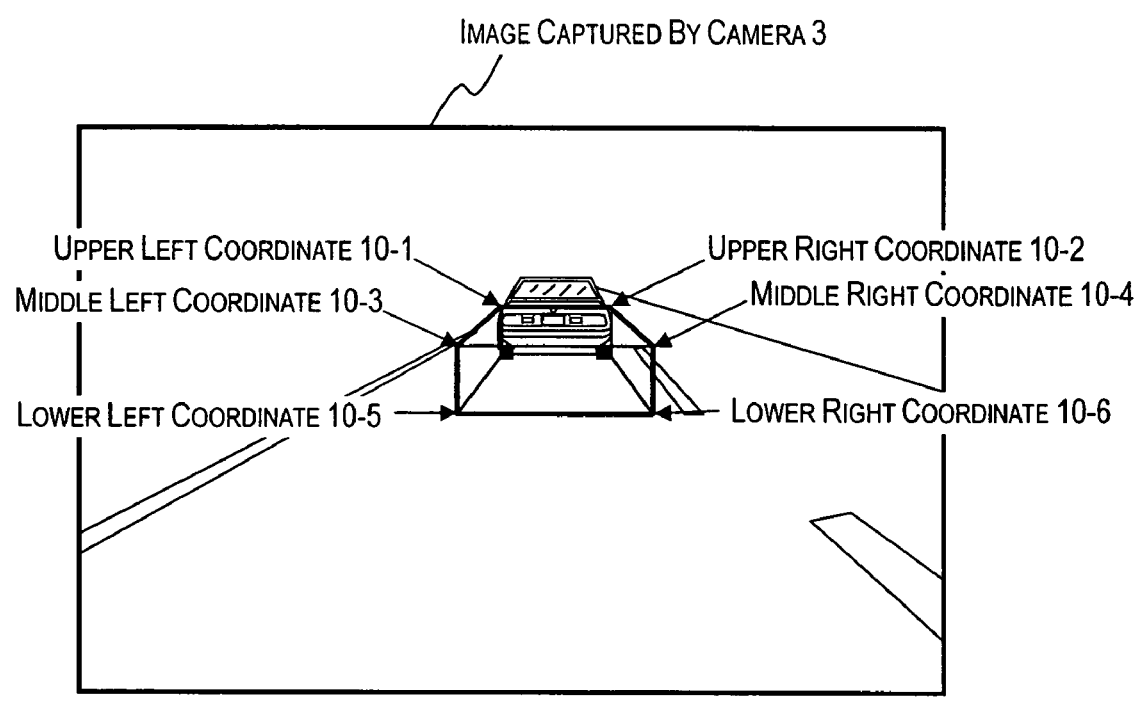
FIG. 5 is a simplified diagrammatic view of an image captured by the camera for illustrating another example of setting an image processing region in the vehicle image processing device in accordance with the first embodiment of the present invention.

When the host vehicle V is traveling along a straight path as shown in FIG. 5, for example, the final image processing region will be hexagonal enclosed by Coordinates 10-1 to 10-6 below.

Upper left coordinate (disp_obj_XL2, disp_obj_YA2) (Coordinate 10-1)
Upper right coordinate (disp_obj_XR2, disp_obj_YA2) (Coordinate 10-2)
Middle left coordinate (disp_obj_XL1, disp_obj_YA1) (Coordinate 10-3)
Middle right coordinate (disp_obj_XR1, disp_obj_YA1) (Coordinate 10-4)
Lower left coordinate (disp_obj_XL1, disp_obj_YB1) (Coordinate 10-5)
Lower right coordinate (disp_obj_XR1, disp_obj_YB1) (Coordinate 10-6)

Although the first embodiment is explained using a case in which two image regions are obtained to set the final image processing region, it is also acceptable to set the final image processing region using more than two image regions to accommodate more complex road shapes. When a larger number of image processing regions are set, the processing used to determine regions for obtaining the final image processing region becomes more complex. Alternative, a single image region can be obtained to set the final image processing region and to minimize the processing.

In step 209 of FIG. 2, the outside circumstance recognizing section 5 is configured and arranged to execute edge extraction processing with respect to the final image processing region set in step 208 in order to extract or derive features (e.g., vehicle edges) of the image within the final image processing region. Of course, other methods of identifying whether a preceding vehicle image is present within the final image processing region can be used. One example of the edge extraction processing executed in step 209 will now be described.

First, an edge image is obtained using a Sobel filter or the like with respect to the final image processing region. The Sobel filter is a computational method that finds the change in gray value between closely adjacent pixels by using derivative computations and serves as an image processing method that is capable of gathering only those portions of the image where the change in gray value is large, such as the boundary between the road and the host vehicle V. The image processing using Sobel filter is conventional image processing method that is well known in the art. Since the image processing using Sobel filter is well known in the art, this method will not be discussed or illustrated in detail herein.

Next, a threshold value is set based on the average value and the dispersion value of the gray values of the edge image, and the edge image is binarized. More specifically, the edge image is categorized into regions where the gray value exceeds the threshold value and regions where the gray value is equal to or less than the threshold value, and is thereby categorized into portions that are clearly edges and portions that are not edges. If the quantity of edges, i.e., the quantity of portions categorized as clearly being edges, or the total length of all edges is equal to or larger than a prescribed value Thr_EdgeNumb (which is set in accordance with the size of the final image processing region), then the region is recognized as a preceding vehicle candidate region. In short, a relatively small region within the final image processing region in which edges are concentrated is recognized as the preceding vehicle candidate region.

The prescribed value Thr_EdgeNumb is a threshold value that is set such that the prescribed value Thr_EdgeNumb increases as the size of the final image processing region increases. For example, in the case of the image shown in FIG. 5, the prescribed value Thr_EdgeNumb is determined based on the surface area A_all of the final image processing region established by Coordinates 10-1 to 10-6. Additionally, in order to improve the performance of the image processing, an area A_strict can be calculated using Equation 11 below based on an edge coordinate Edge_lowest, which is the lowest position in the relatively small region of concentrated edges. In this case, the larger the area A_strict is, the larger the value to which the threshold value Thr_EdgeNumb is set.

$$A\_strict = A1 \times (disp\_obj\_YB1 - Edge\_lowest)/(disp\_obj\_YB1 - disp\_obj\_YB2) + A2 \quad \text{(Equation 11)}$$

The vertical coordinate values disp_obj_YB1, disp_obj_YB2 and Edge_lowest in Equation 11 preferably have a relationship disp_obj_YB1>Edge_lowest>disp_obj_YB2. Equation 11 expresses the finding of an internal division of a surface area A1 of the first image region and a surface area A2 of the second image region based on a coordinate value of an edge positioned lowest with respect to the coordinates disp_obj_YB1 and disp_obj_YB2. As a result, a preceding vehicle positioned between the first image region and the second image region can be detected accurately.

Accordingly, by applying Sobel filter computations to the regions set in steps 206 to 208, the following effects can be obtained. First, by finding an edge image of only the final image processing region, the derivative computations are only applied the region where it is required to, and thus, the image processing load can be reduced. By setting a threshold value for binarization, a more appropriate threshold value can be set than a threshold value set based on an edge image obtained by applying derivative computations to the entire image. As a result, clear (distinct) edge portions are concentrated in the region where the preceding vehicle exists in the image and a stronger correlation can be secured between the distinct edge portions and the quantity of features required to discern a preceding vehicle. In other words, the possibility of the distinct edge portions being representing features within the image that corresponds to the preceding vehicle can be increased. Thus, the chances that the distinct edge portions will be background scenery can be reduced. Furthermore, by setting the distinct edge quantity threshold value based on the size of the image processing region, the preceding vehicle can be detected correctly irregardless of the following distance between the host vehicle V and the preceding vehicle (i.e., whether the following distance is long or short).

In step 210, the outside circumstance recognizing section 5 is configured and arranged to determine whether the preceding vehicle candidate region exists or not based on the results of the edge extraction processing executed in step 209. If the outside circumstance recognizing section 5 determines that the preceding vehicle candidate region exists, the outside circumstance recognizing section 5 is configured and arranged to proceed to step 211. If the outside circumstance recognizing section 5 determines that the preceding vehicle candidate region does not exist, the outside circumstance recognizing section 5 is configured and arranged to proceed to step 212. If the preceding vehicle candidate region is determined to exist, in step 211 the outside circumstance recognizing section 5 is configured and arranged to increment a value TermReco, which represents a period of time during which the relatively small region in the final image processing region is recognized as the preceding vehicle candidate region, using Equation 12 below. Then, the outside circumstance recognizing section 5 is configured and arranged to proceed to step 213.

$$TermReco = TermReco + 1 \quad \text{(Equation 12)}$$

On the other hand, if the outside circumstance recognizing section 5 determines the preceding vehicle candidate region does not exist, in step 212, the outside circumstance recognizing section 5 is configured and arranged to decrement the value TermReco, which represents a period of time during which the small region in the final image processing region is recognized as the preceding vehicle candidate region, using Equation 13 below. Then, the outside circumstance recognizing section 5 is configured and arranged to proceed to step 213.

$$TermReco = TermReco - 1 \quad \text{(Equation 13)}$$

In step 213, the outside circumstance recognizing section 5 is configured and arranged to determine whether the preceding vehicle candidate region represents a preceding vehicle based on the following conditional Equation 14 and set a value of flag FlagJudge in accordance with the determination result.

$$\begin{aligned}&\text{if}(TermRcco > ThJudge), \text{then} \quad \text{(Equation 14)}\\&\{FlagJudge = 1.\}\\&\text{otherwise}\\&\{FlagJudge = 0.\}\end{aligned}$$

The threshold value ThJudge is a positive number expressing the minimum amount of time required to determine that a preceding vehicle exists. By setting the threshold value ThJudge to a larger value, the frequency with which the background scenery is mistakenly recognized as a preceding vehicle can be reduced even further. However, in such case, the time required for an actual preceding vehicle to be recognized as a preceding vehicle by the vehicle image processing device will become longer. The flag FlagJudge is reset to 0 when a preceding vehicle candidate region is detected anew.

In step 214, the outside circumstance recognizing section 5 is configured and arranged to output the flag FlagJudge in order to inform the subsequent stages of the system that a preceding vehicle exists.

Accordingly, with the vehicle image processing device of the first embodiment, first and second potential preceding vehicle positions are predicted based on the behavior information of the host vehicle V (in this embodiment, the vehicle speed Vsp and the steering angle Steer) and an final image processing region for detecting the preceding vehicle in an image captured by the camera 3 is set based on the potential preceding vehicle positions. Consequently, the image processing load can be reduced, a more appropriate binarization threshold value can be set, and a more appropriate threshold value for the quantity of distinct edges can be set. As a result, the frequency with which background scenery or the like is mistakenly detected as a preceding vehicle can be reduced.

Second Embodiment

Figure 6:
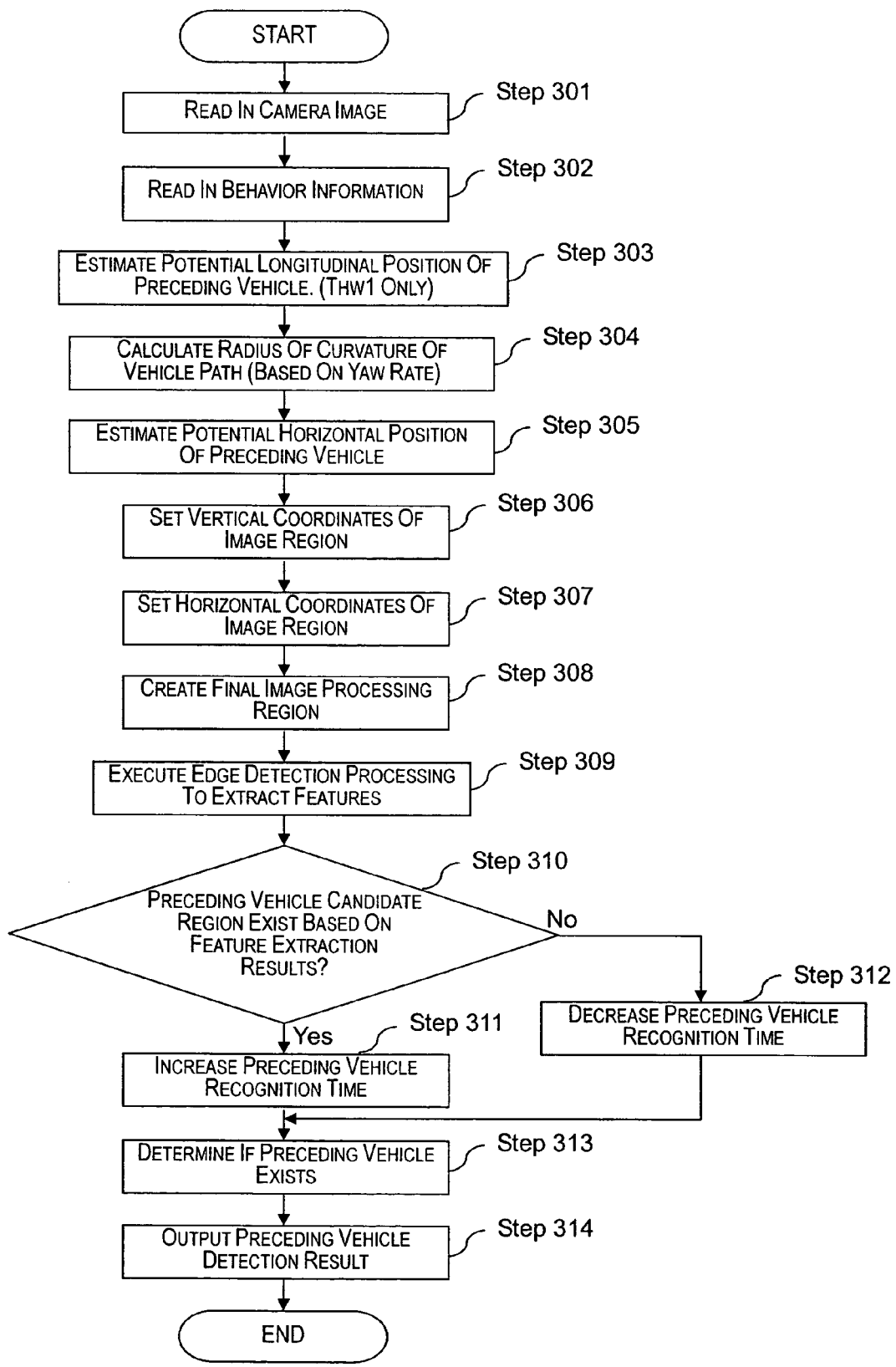
FIG. 6 is a flow chart for explaining a control process for detecting a preceding vehicle using an image processing executed in a vehicle image processing device in accordance with a second embodiment of the present invention.

Referring now to FIG. 6, a vehicle image processing device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle image processing device of the second embodiment is basically identical to the first embodiment except for, in the second embodiment, only the potential longitudinal preceding vehicle position obj_Y1 is found based on the prescribed following distance time Thw1 and the potential horizontal preceding vehicle position obj_X1 is calculated based on the yaw rate ω detected by the yaw rate detecting section 10. The constituent components of the vehicle image processing device of the second embodiment are the same as those of the first embodiment shown in FIG. 1. Thus, descriptions of each component of the vehicle image processing device are omitted for the sake of brevity.

The operation of the vehicle image processing device of the second embodiment will now be described with reference to FIG. 6. FIG. 6 is a flowchart for explaining a control process of a preceding vehicle detecting program for detecting a preceding vehicle executed by the outside circumstance recognizing section 5. The preceding vehicle detecting program involves processing the image captured by the camera 3. The outside circumstance recognizing section 5 is preferably configured and arranged to execute the preceding vehicle detecting program once per prescribed time period, e.g., once every 50 milliseconds. Steps 301 and 302 in FIG. 6 are substantially identical to steps 201 and 202 of FIG. 2 and thus explanations thereof are omitted for brevity.

Step 303 of FIG. 6 is basically identical to step 203 shown in FIG. 2 except that the outside circumstance recognizing section 5 is configured and arranged to calculate one potential longitudinal position obj_Y1 of the preceding vehicle based on the prescribed following time Thw1. Thus, the outside circumstance recognizing section 5 is configured and arranged to estimate only the potential longitudinal position obj_Y1 given by Equation 1-1 explained above.

In step 304, the outside circumstance recognizing section 5 is configured and arranged to calculate the radius of curvature Row (in units of meters) of the path on which the host vehicle V is traveling using Equation 15 below based on the vehicle speed Vsp and the yaw rate ω detected in step 302.

$$Row = Vsp/\omega \quad \text{(Equation 15)}$$

Although in the first embodiment the radius of curvature Row is calculated based on the steering angle Steer of the host vehicle V, it is also acceptable to compare the precision of the yaw rate detecting section 10 and the steering angle detecting section 7 and dynamically select the radius of curvature Row having the higher precision in accordance with the current traveling conditions. For example, since slippage causes the vehicle body not to move in accordance with the steering angle when the coefficient of friction of the road surface is low, a road surface friction coefficient sensor (not shown) can be provided to detect the coefficient of friction of the road during travel and the radius of curvature Row obtained based on the yaw rate ω from the yaw rate detecting section 10 as in Equation 15 can be selected when the coefficient of friction of the road surface is determined to be low.

Step 305 is substantially identical to step 205 of FIG. 2 except that the outside circumstance recognizing section 5 is configured and arranged to calculate only a potential horizontal position obj_X1 using Equation 3 explained above. Step 306 is substantially identical to step 206 of FIG. 2 except that the outside circumstance recognizing section 5 is configured and arranged to determine the vertical coordinates disp_obj_YA1 and disp_obj_YA2 of the first image region on a coordinate system set on the image captured by the camera 3 using Equations 4-1 and 4-2. Step 307 is basically identical to step 207 except that the outside circumstance recognizing section 5 is configured and arranged to determine the horizontal coordinates disp_obj_XL1 and disp_obj_XR2 of the first image region on a coordinate system set on the image captured by the camera 3 using Equations 5-1 and 5-2.

Step 308 is basically identical to step 208 of FIG. 2 except that the outside circumstance recognizing section 5 is configured to set a rectangular final image processing region using Coordinates 8-1 to 8-4. Steps 309 to 314 are basically identical to steps 209 to 214 of FIG. 2, and thus, explanations thereof are omitted for the sake of brevity.

The vehicle image processing device of the second embodiment enables the reduction of the image processing load, the setting of an appropriate binarization threshold value, and setting of the an appropriate distinctive edge quantity threshold value to be accomplished more simply than with the first embodiment. However, since the estimation of the potential preceding vehicle position does not cover as wide an area as the estimation provided by the first embodiment, the frequency with which the vehicle image processing device is unable to detect a preceding vehicle because the preceding vehicle is outside the potential position increases. Furthermore, even if the vertical coordinate disp_obj_YA1 of the image processing region is set to be closer to the top of the image captured by the camera 3 so that preceding vehicles that are farther away can be detected, there is the possibility that the frequency with which edges existing in the distant background scenery are mistakenly recognized as a preceding vehicle will increase because the process is not designed to zero in on the more distant portions of the image.

Third Embodiment

Figure 7:
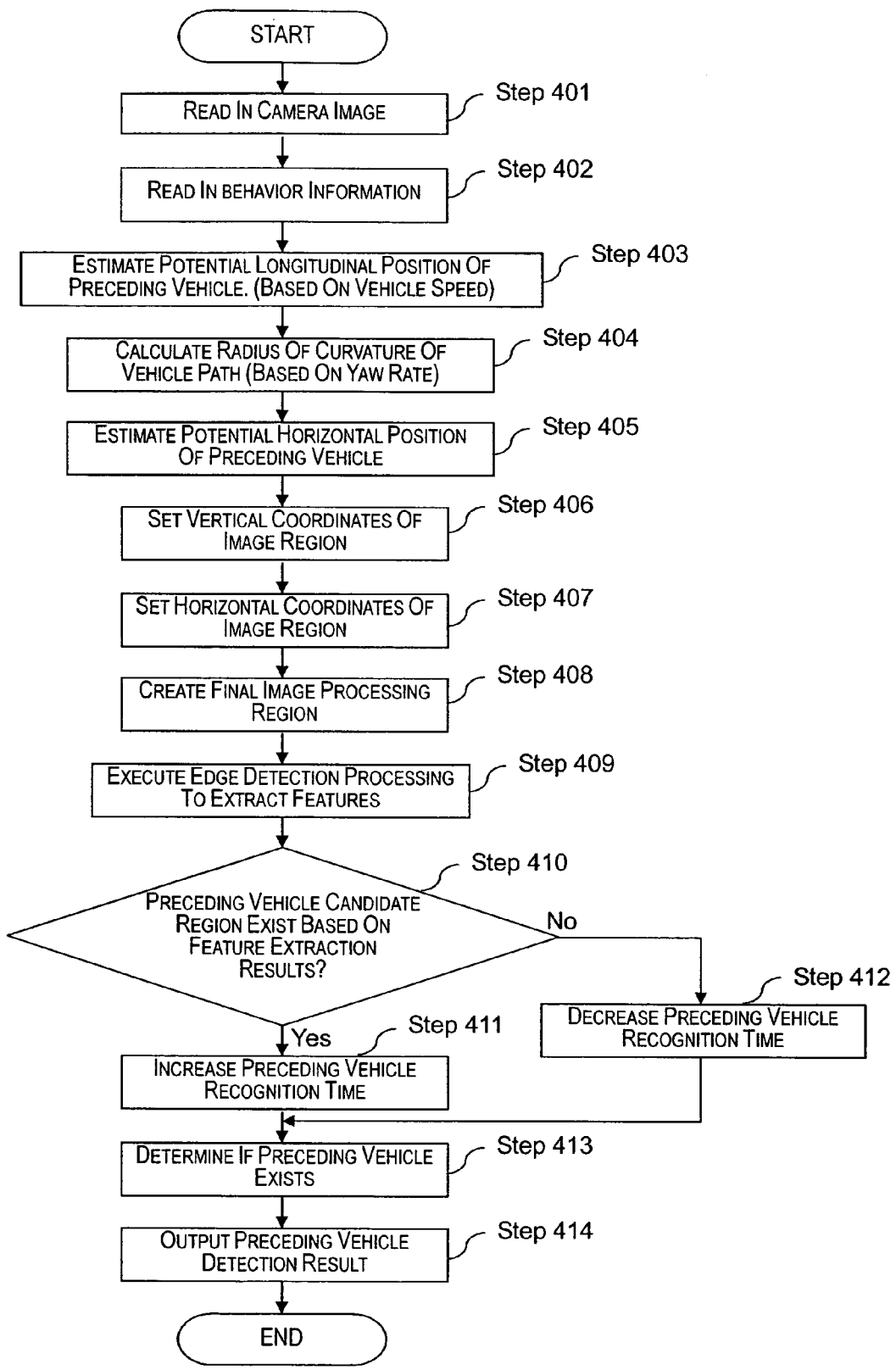
FIG. 7 is a flow chart for explaining a control process for detecting a preceding vehicle using an image processing executed in a vehicle image processing device in accordance with a third embodiment of the present invention.
Figure 8:
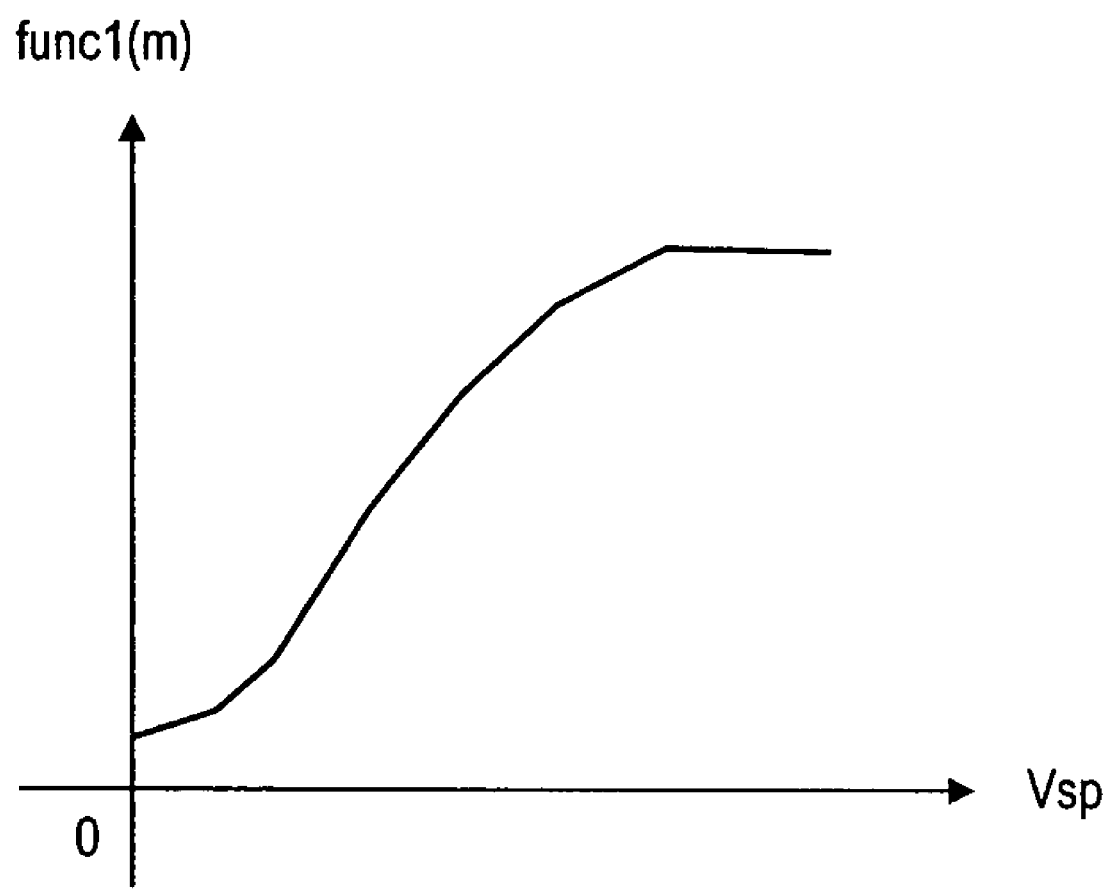
FIG. 8 is a simplified chart illustrating a function having a characteristic that increases a value as a vehicle speed increases, which is used in the control process executed in the vehicle image processing device in accordance with the third embodiment of the present invention.

Referring now to FIGS. 7 and 8, a vehicle image processing device in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

The vehicle image processing device of the third embodiment is basically identical to the second embodiment except that the potential longitudinal preceding vehicle position obj_Y1 is estimated based on the vehicle speed Vsp of the host vehicle V using a function fund in the third embodiment of the present invention. The constituent components of the vehicle image processing device of the third embodiment are the same as those of the first embodiment shown in FIG. 1, and thus, descriptions thereof are omitted for the sake of brevity.

The operation of the vehicle image processing device of the third embodiment will now be described with reference to FIG. 7. FIG. 7 is a flowchart for explaining a control process of a preceding vehicle detecting program for detecting a preceding vehicle executed by the outside circumstance recognizing section 5. The preceding vehicle detecting program involves processing the image captured by the camera 3. The outside circumstance recognizing section 5 is preferably configured and arranged to execute the preceding vehicle detecting program once per prescribed time period, e.g., once every 50 milliseconds. Steps 401 and 402 are substantially identical to steps 201 and 202 of FIG. 2, and thus, explanations thereof are omitted for brevity.

In step 403, the outside circumstance recognizing section 5 is configured and arranged to estimate the potential longitudinal position obj_Y1 of the preceding vehicle using Equation 16 below.

$$obj\_Y1 = func1(Vsp) \quad \text{(Equation 16)}$$

In Equation 16, func1 is a function construed such that fund becomes larger as the vehicle speed Vsp of the host vehicle V becomes larger. For example, FIG. 8 illustrates the characteristic of func1 with respect to the vehicle speed Vsp. Steps 404 to 414 are basically identical to steps 304 to 314 of FIG. 6 and explanations thereof are omitted for the sake of brevity.

Thus, in addition to the effects of the previously described second embodiment, the third embodiment enables the estimation or prediction of the potential preceding vehicle position to be made more precisely because the vehicle image processing device can obtained the potential position based on a function with respect to the vehicle speed Vsp which has a non-linear curve as shown in FIG. 8. Consequently, it is easier to reflect the results of tuning in accordance with the travel location and travel time and preceding vehicles can be detected with a higher probability. Alternatively, similarly to the first embodiment, the estimation of the potential existence position of the preceding vehicle can be made to cover a wider area by using an additional function other than func1. Using two functions would also make it possible to zero in on the more distant portions of the image and reduce the frequency with which edges existing in the distant background scenery are mistakenly recognized as a preceding vehicle.

Fourth Embodiment

Figure 9:
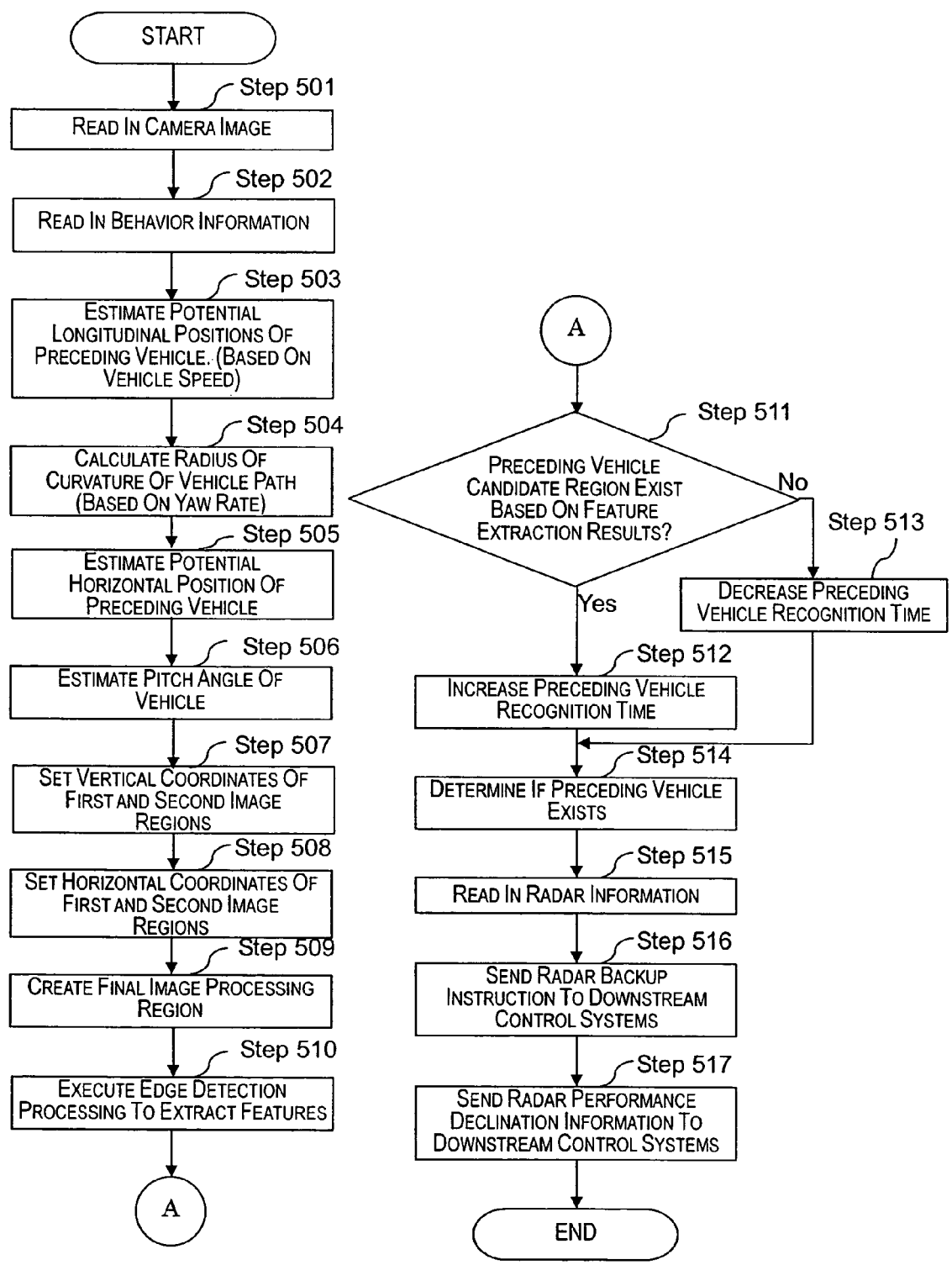
FIG. 9 is a flow chart for explaining a control process for detecting a preceding vehicle using an image processing executed in a vehicle image processing device in accordance with a fourth embodiment of the present invention.
Figure 10:
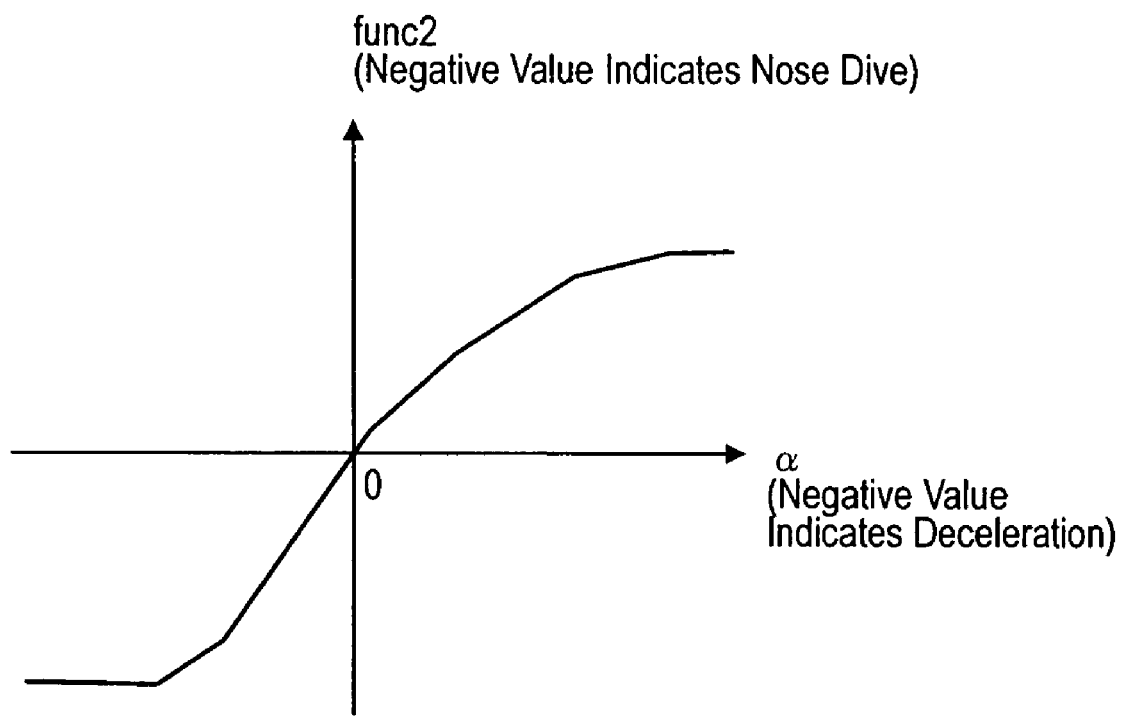
FIG. 10 is a simplified chart illustrating a function with respect to an acceleration/deceleration rate of the vehicle that is used in the control process in the vehicle image processing device in accordance with the fourth embodiment of the present invention.

Referring now to FIGS. 9 and 10, a vehicle image processing device in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The vehicle image processing device of the fourth embodiment is basically identical to the first embodiment except in the fourth embodiment, the vertical coordinate values of the first and second image regions (e.g., disp_obj_YA1, disp_obj_YB1, disp_obj_YA2, and disp_obj_YB2) are set by taking a pitch angle PitchAngle of the host vehicle V (which varies depending on the acceleration/deceleration of the host vehicle V) into consideration. The constituent components of the vehicle image processing device of the fourth embodiment are the same as those of the first embodiment shown in FIG. 1 and descriptions thereof are omitted for the sake of brevity.

The operation of the vehicle image processing device of the fourth embodiment will now be described with reference to FIG. 9. FIG. 9 is a flowchart for explaining a control process of a preceding vehicle detecting program for detecting a preceding vehicle executed by the outside circumstance recognizing section 5. The preceding vehicle detecting program involves processing the image captured by the camera 3. The outside circumstance recognizing section 5 is preferably configured and arranged to execute the preceding vehicle detecting program once per prescribed time period, e.g., once every 50 milliseconds. Steps 501 to 505 in FIG. 9 are substantially identical to steps 201 to 205 of FIG. 2 and thus explanations thereof are omitted for brevity.

In step 506, the outside circumstance recognizing section 5 is configured and arranged to estimate the pitch angle PitchAngle (in radians) of the host vehicle V and calculate an deviation amount CompPitch by which the center positions of the first and second image regions move using the following Equations 17 and 18.

$$\text{PitchAngle} = \text{func2}(\alpha) \quad \text{(Equation 17)}$$

$$\text{CompPitch} = \text{PixVert} \times \text{PitchAngle} / \text{VertAngle} \quad \text{(Equation 18)}$$

In Equation 17, $\alpha$ is an acceleration/deceleration rate of the host vehicle V and the acceleration/deceleration rate $\alpha$ indicates acceleration when positive. The function func2 is a function whose value varies in accordance with the acceleration/deceleration rate $\alpha$. For example, FIG. 8 illustrates a general characteristic of the function func2 with respect to the acceleration/deceleration rate $\alpha$. In Equation 18, PixVert is a number of pixels (pix) in the vertical direction of the image captured by the camera 3 that is read by the outside circumstance recognizing section 5 in step 501 and VertAngle is a vertical viewing field angle (in radians).

The acceleration/deceleration rate $\alpha$ is preferably obtained by an acceleration sensor (not shown) installed in the host vehicle V. Thus, the pitch angle PitchAngle of the host vehicle V can be estimated based on the acceleration/deceleration a obtained from the acceleration sensor. It will be apparent to those skilled in the art from this disclosure that it is also acceptable to calculate the acceleration/deceleration rate $\alpha$ based on a time derivative of the vehicle speed if the host vehicle V is not provided with an acceleration sensor. Of course, it is also acceptable to read in the pitch angle PitchAngle directly if the host vehicle V is provided with a pitch angle sensor.

Step 507 is substantially identical to step 206 of FIG. 2 except that the vertical coordinates of the first and second image regions disp_obj_YA1, disp_obj_YB1, disp_obj_YA2, and disp_obj_YB2 are determined using Equations 19-1 to 19-4.

$$disp\_obj\_YA1 = y0 + (\text{focus} V \times CAM\_h2 / obj\_Y1) + \text{CompPitch} \quad \text{(Equation 19-1)}$$

$$disp\_obj\_YB1 = y0 + (\text{focus} V \times CAM\_h / obj\_Y1) + \text{CompPitch} \quad \text{(Equation 19-2)}$$

$$disp\_obj\_YA2 = y0 + (\text{focus} V \times CAM\_h2 / obj\_Y2) + \text{CompPitch} \quad \text{(Equation 19-3)}$$

$$disp\_obj\_YB2 = y0 + (\text{focus} V \times CAM\_h / obj\_Y2) + \text{CompPitch} \quad \text{(Equation 19-4)}$$

In other words, in the fourth embodiment of the present invention, the vertical coordinates of the first and second image regions disp_obj_YA1, disp_obj_YB1, disp_obj_YA2, and disp_obj_YB2 are determined by taking the pitch angle PitchAngle into consideration.

Steps 508 to 514 of FIG. 9 are substantially identical to steps 207 to 213 of FIG. 2 and explanations thereof are omitted for the sake of brevity.

In step 515, the outside circumstance recognizing section 5 is configured and arranged to read the preceding vehicle detection result flag RadarFlagJudge from the radar 1. In step 516, if the radar 1 does not recognize anything (when the preceding vehicle detection result flag RadarFlagJudge is false) but the value of the preceding vehicle detection flag FlagJudge obtained in step 514 indicates that a preceding vehicle exists, the outside circumstance recognizing section 5 is configured and arranged to issue an instruction advising the downstream control systems and alarm system to use the image processing result as a backup to the result obtained from the radar 1.

In step 517, if the radar 1 can detect a nearby structural body on the side of the road but the value of the preceding vehicle detection result flag FlagJudge indicates that a preceding vehicle exists, the outside circumstance recognizing section 5 is configured and arranged to issue an information informing the downstream control systems and alarm system that the detection performance of the radar 1 has declined and ends the processing sequence.

In addition to the effects of the first embodiment, the fourth embodiment of the present invention can set an appropriate binarization threshold value and an appropriate distinct edge quantity threshold value even when the host vehicle V is accelerating or decelerating. As a result, the frequency with which background scenery or the like is mistakenly detected as a preceding vehicle can be reduced.

Accordingly, the vehicle image processing device of the first to fourth embodiments of the present invention is configured and arranged to capture an image of an area in front of the host vehicle V by the camera 3 and to obtain the behavior information (e.g., the vehicle speed, the steering angle, and/or the yaw rate) of the host vehicle V. Based on the behavior information of the host vehicle V, the vehicle image processing device of the present invention is configured and arranged to estimate at least one potential position of a preceding vehicle. Then, based on the at least one estimated potential preceding vehicle position, the vehicle image processing device is configured and arranged to set an image processing region for detecting the preceding vehicle in the image captured by the camera 3. The vehicle image processing device then is configured and arranged to derive features of the image within the image processing region and detect the preceding vehicle based on the derived features. As a result, it is not necessary to detect the white lines of the road on which the host vehicle V is traveling in order to conduct the image processing for detecting the preceding vehicle. Thus, the preceding vehicle detection processing can be conducted efficiently without depending on the conditions under which the white lines are detected while the host vehicle V is traveling.

Moreover, in the embodiments explained above, the vehicle image processing device is configured and arranged to set at least two image processing regions that are closely adjacent in terms of time. Thus, the frequency with which background scenery or the like is mistakenly detected as a preceding vehicle can be reduced.

Also, in the embodiments explained above, the vehicle image processing device is configured and arranged to set at least two image processing regions such that the surface area of one is smaller than the surface area of the other. Thus, the frequency with which background scenery or the like is mistakenly recognized as a preceding vehicle can be further reduced.

Furthermore, with one of the embodiments described heretofore, the vehicle image processing device is configured and arranged to set at least two image processing regions such that one is more advanced than the other in terms of time. Thus, the frequency with which background scenery or the like is mistakenly recognized as a preceding vehicle can be reduced.

In some of the embodiments described above, at least two image processing regions are connected together to form the final image processing region. Thus, a preceding vehicle can be detected reliably even if the estimated existence positions cover a wide area.

Moreover, in some of the embodiments of the present invention described above, the center of an image processing region is moved toward the top of the image captured by the camera 3 as the vehicle speed increases. Thus, the probability of detecting a preceding vehicle in the image processing region is increased and the preceding vehicle can be detected reliably.

Furthermore, in some of the embodiments described above, the center of the image processing region is moved toward the top of the photographed image as the product of a predetermined following time and the vehicle speed increases. Thus, the probability of detecting a preceding vehicle within the image processing region is increased and the preceding vehicle can be detected reliably.

In some of the embodiments described above, the surface area of the image processing region is reduced as the product of a predetermined following time and the vehicle speed increases. Thus, the frequency with which background scenery or the like is mistakenly recognized as a preceding vehicle can be reduced.

Moreover, in the second embodiment of the present invention, the potential horizontal position of the preceding vehicle is estimated based on the steering angle of the host vehicle V and the image processing region is set based on the estimated potential horizontal position of the preceding vehicle. Thus, the probability of detecting a preceding vehicle within the image processing region is increased and the preceding vehicle can be detected reliably because.

In the third embodiment of the present invention, the potential horizontal position of the preceding vehicle is estimated based on the yaw rate of the host vehicle V and the image processing region is set based on the estimated potential horizontal position of the preceding vehicle. Thus, the probability of detecting a preceding vehicle is increased and the preceding vehicle can be detected reliably because.

In the fourth embodiment of the present invention, the image processing region is moved up and down within the image captured by the camera 3 in accordance with the pitching angle of the host vehicle V. Thus, the probability of detecting a preceding vehicle within the image processing region is increased and the preceding vehicle can be detected reliably even when the host vehicle V undergoes pitching.

Moreover, with the vehicle image processing device of the present invention, threshold values for the quantity of image features are set in accordance with the size of the image processing region and the features of the image are derived while comparing the quantity of image features with the threshold values. Thus, a preceding vehicle can be detected correctly irregardless of the following distance with respect to the preceding vehicle (i.e., whether the following distance is long or short).

Furthermore, in the fourth embodiment of the present invention, the vehicle image processing device is configured and arranged to accurately determine whether the detecting performance of the radar 1 or other distance measuring devices has declined based on the image processing result, i.e., the preceding vehicle detection result. Also, the vehicle image processing device is configured and arranged to improve the functionality and performance of an outside circumstance recognizing system comprising the radar 1 or other distance measuring devices and the camera 3 by backing up the radar 1 or other distance measuring device with the image processing result.

The camera 3 preferably constitutes an image capturing section. The vehicle detecting section 6, the steering angle detecting section 7, and the yaw rate detecting section 10 preferably constitute the host vehicle behavior detecting section. The outside circumstance recognizing section 5 preferably constitutes the preceding vehicle position predicting section, the processing region setting section, and the preceding vehicle detecting section. The image processing section 4 preferably constitutes the feature deriving section. The steering angle detecting section 7 preferably also constitutes the steering angle detecting section. So long as the characteristic functions of the present invention are not lost, the constituent elements are not limited to the particular devices described heretofore.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-381181. The entire disclosure of Japanese Patent Application No. 2003-381181 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle image processing device comprising:
    an image capturing section configured to capture an image of an area in front of a host vehicle in which the vehicle image processing device is installed;
    a host vehicle behavior detecting section configured to obtain behavior information of the host vehicle;
    a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;
    a processing region setting section configured to reduce image processing load by setting an image processing region within the image, which is less than an entire area of the image, based on the potential preceding vehicle position; and
    a preceding vehicle detecting section configured to detect if an actual preceding vehicle is present within the image processing region of the image based on processing of the image processing region of the image, that has been set by the processing region setting section.

2. The vehicle image processing device as recited in claim 1, further comprising
    a distinct profile sensing section configured and arranged to identify a distinct profile within the image processing region such that the preceding vehicle detecting section detects whether the actual preceding vehicle is present within the image processing region based on a detection of the distinct profile.

3. The vehicle image processing device as recited in claim 2, wherein
    distinct profile sensing section is configured to set a threshold value for identifying the distinct profile within the image processing region in accordance with a size of the image processing region.

4. The vehicle image processing device as recited in claim 1, wherein
    the host vehicle behavior detecting section is configured to detect at least a speed of the host vehicle as the behavior information.

5. A vehicle comprising the image processing device according to claim 1 installed in a vehicle main body.

6. A vehicle image processing device comprising:
    an image capturing section configured to capture an image of an area in front of a host vehicle in which the vehicle image processing device is installed;
    a host vehicle behavior detecting section configured to obtain behavior information of the host vehicle;
    a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;
    a processing region setting section configured to set an image processing region within the image by using at least first and second image regions of the image, that correspond to different potential preceding vehicle positions of the preceding vehicle along a vehicle path in the image captured by the image capturing section; and
    a preceding vehicle detecting section configured to detect if an actual preceding vehicle is present in front of the host vehicle based on processing of the image processing region of the image.

7. The vehicle image processing device as recited in claim 6, wherein
    the processing region setting section is configured such that the first image region corresponds to a shorter following distance time than the second image region.

8. The vehicle image processing device as recited in claim 7, wherein
    the processing region setting section is configured to set the first and second image regions such that the second image region has a smaller area than the first image region.

9. The vehicle image processing device as recited in claim 6, wherein
    the processing region setting section is configured to set the first and second image regions such that the second image region has a smaller area than the first image region.

10. The vehicle image processing device as recited in claim 6, wherein
    the processing region setting section is configured to set the first and second image regions based on first and second potential preceding vehicle positions predicted by the preceding vehicle position predicting section.

11. The vehicle image processing device as recited in claim 10, wherein the preceding vehicle position predicting section is configured and arranged to predict the first and second potential preceding vehicle positions by using first and second prescribed following distance times, respectively.

12. The vehicle image processing device as recited in claim 11, wherein the processing region setting section is configured such that the first prescribed following distance time is set shorter than the second prescribed following distance time.

13. A vehicle image processing device comprising:

image capturing means for capturing an image of an area in front of a host vehicle in which the vehicle image processing device is installed;

behavior detecting means for obtaining behavior information of the host vehicle;

preceding vehicle position predicting means for estimating information relating to a distance between the host vehicle and a preceding vehicle and information relating to a future path of the host vehicle based on the behavior information of the host vehicle, and for predicting a potential preceding vehicle position of the preceding vehicle based on the information relating to the distance between the host vehicle and the preceding vehicle and the information relating to the future path of the host vehicle;

processing region setting means for reducing image processing load by setting an image processing region within the image, which is less than an entire area of the image, based on the potential preceding vehicle position; and preceding vehicle detecting means for detecting if an actual preceding vehicle is present within the image processing region of the image based on processing of the image processing region of the image, that has been set by the processing region setting means.

14. A method of detecting a preceding vehicle comprising:

capturing an image of an area in front of a host vehicle;

obtaining behavior information of the host vehicle;

estimating information relating to a distance between the host vehicle and a preceding vehicle and information relating to a future path of the host vehicle based on the behavior information of the host vehicle;

predicting a potential preceding vehicle position of the preceding vehicle with respect to the host vehicle based on the information relating to the distance between the host vehicle and the preceding vehicle and the information relating to the future path of the host vehicle;

reducing image processing load by setting an image processing region within the image, which is less than an entire area of the image, based on the potential preceding vehicle position; and detecting if an actual preceding vehicle is present within the image processing region of the image by processing the image processing region of the image, that has been set by the setting of the image processing region.

15. A vehicle image processing device comprising:

an image capturing section configured to capture an image of an area in front of a host vehicle in which the vehicle image processing device is installed;

a host vehicle behavior detecting section configured to detect at least a steering angle of the host vehicle as behavior information of the host vehicle;

a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;

a processing region setting section configured to set an image processing region of the image based on the potential preceding vehicle position; and a preceding vehicle detecting section configured to detect if an actual preceding vehicle is present in front of the host vehicle based on processing of the image processing region of the image.

16. The vehicle image processing device as recited in claim 15, wherein the preceding vehicle position predicting section is configured to predict a potential horizontal preceding vehicle position based on the steering angle of the host vehicle detected by the host vehicle behavior detecting section; and the processing region setting section is configured to set the image processing region based on the potential horizontal preceding vehicle position predicted by the preceding vehicle position predicting section.

17. A vehicle image processing device comprising:

an image capturing section configured to capture an image of an area in front of a host vehicle in which the vehicle image processing device is installed;

a host vehicle behavior detecting section configured and arranged to detect at least a yaw rate of the host vehicle as the behavior information of the host vehicle;

a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;

a processing region setting section configured to set an image processing region of the image based on the potential preceding vehicle position; and a preceding vehicle detecting section configured to detect if an actual preceding vehicle is present in front of the host vehicle based on processing of the image processing region of the image.

18. The vehicle image processing device as recited in claim 17, wherein the preceding vehicle position predicting section is configured and arranged to predict a potential horizontal preceding vehicle position based on the yaw rate of the vehicle detected by the host vehicle behavior detecting section; and the processing region setting section is configured to set the image processing region based on the potential preceding vehicle horizontal position predicted by the preceding vehicle position predicting section.

19. A vehicle image processing device comprising:

an image capturing section configured to capture an image of an area in front of a host vehicle in which the vehicle image processing device is installed;

a host vehicle behavior detecting section configured and arranged to detect at least a pitch angle of the host vehicle as the behavior information of the host vehicle;

a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;

a processing region setting section configured to set an image processing region of the image based on the potential preceding vehicle position; and a preceding vehicle detecting section configured to detect if an actual preceding vehicle is present in front of the host vehicle based on processing of the image processing region of the image.

20. The vehicle image processing device as recited in claim 19, wherein
the processing region setting section is configured to move the image processing region in a vertical direction within the image captured by the image capturing section in accordance with the pitch angle of the host vehicle detected by the host vehicle behavior detecting section.

21. A vehicle image processing device comprising:
an image capturing section configured to capture an image of an area in front of a host vehicle in which the vehicle image processing device is installed;

a host vehicle behavior detecting section configured to obtain behavior information of the host vehicle;

a preceding vehicle position predicting section configured to estimate information relating to a distance between the host vehicle and a preceding vehicle and information relating to a future path of the host vehicle based on the behavior information of the host vehicle, and configured to predict a potential preceding vehicle position of the preceding vehicle based on the information relating to the distance between the host vehicle and the preceding vehicle and the information relating to the future path of the host vehicle;

a processing region setting section configured to set an image processing region of the image by using at least first and second image regions that correspond to different potential preceding vehicle positions of the preceding vehicle in the image captured by the image capturing section, the processing region setting section further configured to connect the first and second image regions to obtain a final composite image as the image processing region; and a preceding vehicle detecting section configured to detect if an actual preceding vehicle is present in front of the host vehicle based on processing of the image processing region of the image.

22. The vehicle image processing device as recited in claim 21, wherein
the processing region setting section is configured to move a center of the image processing region closer to a top portion of the image captured by the image capturing section as a speed of the host vehicle increases.

23. The vehicle image processing device as recited in claim 21, wherein
the processing region setting section is configured to move a center of the image processing region closer to a top of the image captured by the image capturing section as a product of a prescribed following distance time and a speed of the host vehicle increases.

24. The vehicle image processing device as recited in claim 21, wherein
the processing region setting section is configured to set the image processing region such that an area of the image processing region is reduced as a product of a prescribed following distance time and a speed of the host vehicle increases.

* * * * *